(12) United States Patent
Kozlov

(10) Patent No.: US 11,528,059 B2
(45) Date of Patent: Dec. 13, 2022

(54) HIGH FREQUENCY (HF) RADIO COMMUNICATIONS NETWORK COMPRISING A CENTRAL PROCESSING SERVER FOR AGGREGATING DIGITAL SAMPLES AND AN ASSOCIATED METHOD

(71) Applicant: ELBIT SYSTEMS LAND AND C4I LTD., Netanya (IL)

(72) Inventor: Alexey Kozlov, Netanya (IL)

(73) Assignee: ELBIT SYSTEMS LAND AND C4I LTD., Netanya (IL)

( * ) Notice: Subject to any disclaimer, the term of this patent is extended or adjusted under 35 U.S.C. 154(b) by 0 days.

(21) Appl. No.: 17/537,500

(22) Filed: Nov. 30, 2021

(65) Prior Publication Data
US 2022/0085849 A1   Mar. 17, 2022

Related U.S. Application Data

(63) Continuation of application No. PCT/IL2020/050586, filed on May 27, 2020.

(30) Foreign Application Priority Data

Jun. 27, 2019 (IL) .......................................... 267746

(51) Int. Cl.
*H04B 7/024* (2017.01)
*H04W 76/10* (2018.01)
*H04B 7/0452* (2017.01)

(52) U.S. Cl.
CPC .......... *H04B 7/024* (2013.01); *H04B 7/0452* (2013.01); *H04W 76/10* (2018.02)

(58) Field of Classification Search
CPC .......... H04B 1/00; H04B 1/0003; H04B 7/04; H04B 7/08; H04B 7/022; H04B 7/024;
(Continued)

(56) References Cited

U.S. PATENT DOCUMENTS 8,090,326 B1 * 1/2012 Wu ..................... H04B 1/0057
455/73
9,584,193 B2 * 2/2017 Stratigos, Jr. ........ H04B 1/0003
(Continued)

OTHER PUBLICATIONS

Cognitive HF—New Perspectives to Use the High Frequency Band; Published in Published Jul. 23, 2014; Publisher IEEE :19th International Conference on Cognitive Radio Oriented Wireless Networks; https://eudl.eu/doi/10.4108/icst.crowncom.2014.255810; Vanninen et al, Whole Document.
(Continued)

*Primary Examiner* — Shawkat M Ali

(57) ABSTRACT

A high frequency (HF) radio communications system is disclosed. HF radio communications system comprises a plurality of geographically-distributed HF radio sites comprising a corresponding plurality of receivers, each receiver of the plurality of receivers being configured to: (a) receive, via at least one antenna, respective HF signals throughout a HF band, and (b) directly and concurrently sample a subset of the respective HF signals to provide a respective stream of digital samples, the subset being the respective HF signals that are received over a plurality of HF channels within part of the HF band or all of the HF band; and a central processing server configured to receive a plurality of respective streams of digital samples from the plurality of receivers, being the respective stream of digital samples provided by each receiver of the receivers.

20 Claims, 3 Drawing Sheets

(58) Field of Classification Search
CPC .... H04B 7/0452; H04B 7/0885; H04B 7/185; H04L 7/00; H04L 27/00; H04L 27/06; H04L 27/28; H04L 29/06; H04W 24/00; H04W 56/00; H04W 72/04; H04W 76/10; H04W 84/18
USPC ........ 370/203, 278, 332; 375/260, 267, 316, 375/347, 349
See application file for complete search history.

(56) References Cited

U.S. PATENT DOCUMENTS

| | | |
|---|---|---|
| 9,713,155 B2 * | 7/2017 | Negus ...................... H04B 7/04 |
| 2008/0080631 A1 | 4/2008 | Forenza et al. |
| 2017/0201297 A1 | 7/2017 | Stratigos, Jr. |

OTHER PUBLICATIONS

Fast automatic link establishment: A new metric and the value of spectrum prediction. 2016 8th International Conference on Wireless Communications & Signal Processing (WCSP); IEEE, Ling Y. et al. Oct. 13, 2016. Whole Document.

* cited by examiner

HIGH FREQUENCY (HF) RADIO COMMUNICATIONS NETWORK COMPRISING A CENTRAL PROCESSING SERVER FOR AGGREGATING DIGITAL SAMPLES AND AN ASSOCIATED METHOD

TECHNICAL FIELD

The invention relates to a high frequency (HF) radio communications system comprising a central processing server for aggregating digital samples and an associated method.

BACKGROUND

In a conventional HF radio communications system, each user of the system is capable of processing, at any given time, only HF signals that are received at a single HF antenna or a set of co-located HF antennas. This limits a performance capability of the HF radio communications system.

Thus, there is a need in the art for a new HF radio communications system comprising a central processing server for aggregating digital samples and an associated method.

References considered to be relevant as background to the presently disclosed subject matter are listed below. Acknowledgement of the references herein is not to be inferred as meaning that these are in any way relevant to the patentability of the presently disclosed subject matter.

U.S. Patent Application Publication No. 2015/0249486 ("Stratigos, Jr."), published on Sep. 3, 2015, is directed to methods and systems for providing a distributed radio communications network. Each of a first gateway and a second gateway may separately receive modulated signals comprising at least a portion of data from a first node of a plurality of geographically-dispersed nodes. The modulated signals may be wirelessly transmitted as radio frequency (RF) signals from the first node, the data gathered or generated by the first node at a first location. A server may receive the modulated signals from the first gateway and the second gateway. As configured by software-defined radio (SDR) software, the server may perform processing of the separately received modulated signals to recover the data. The processing may include demodulation of the modulated signals.

U.S. Patent Application Publication No. 2017/0070970 ("Kono"), published on Mar. 9, 2017, discloses a non-transitory computer-readable storage medium that stores a program that causes a computer to execute a process. The process includes: receiving radio signals from base stations, the radio signals being generated by the base stations based on a modulated signal received at the base stations; determining one or more reception target signals in the received radio signals, the reception target signals having a predetermined target frequency and being modulated according to a predetermined target modulation scheme; aligning the reception target signals with each other; generating a demodulation target signal based on the aligned reception target signals; and demodulating the generated demodulation target signal.

HF Cellular Network: A HF ALE Global Gateway, published in 2012, discloses setting all radio sites within an HF network to scan available frequencies (or channels) in Automatic Link Establishment (ALE) mode, waiting for a mobile platform to initiate an ALE call. All radio sites that hear a call, stop scanning, "listen" to the call and perform a link quality analysis (LQA) measurement. Each radio site reports its LQA measurement back to a central HF Cellular server. The server determines which radio site has the best LQA and directs that radio site to complete the ALE link with the mobile platform. In this way, no matter where the platform is located, the best propagating link (channel and ground entry site) is made with that platform. The HF Cellular server then connects the radio site to the control center operator being addressed by the mobile platform. The interconnection process is completely transparent to the mobile platform operator and to the control center operator. The unused/unlinked radio sites are free to accept additional calls with other mobile platforms or control center operators.

General Description

In accordance with a first aspect of the presently disclosed subject matter, there is provided a high frequency (HF) radio communications system comprising: a plurality of geographically-distributed HF radio sites comprising a corresponding plurality of receivers, each receiver of the plurality of receivers being configured to: (a) receive, via at least one antenna, respective HF signals throughout a HF band, and (b) directly and concurrently sample a subset of the respective HF signals to provide a respective stream of digital samples, the subset being the respective HF signals that are received over a plurality of HF channels within part of the HF band or all of the HF band, and a central processing server configured to receive a plurality of respective streams of digital samples from the plurality of receivers, being the respective stream of digital samples provided by each receiver of the receivers.

In some cases, each receiver of the receivers is further configured to process the respective stream of digital samples, upon detecting downtime of the central processing server.

In some cases, at least one user of the HF radio communications system works on a first HF channel of the plurality of HF channels using two or more given receivers, of the plurality of receivers, simultaneously, and in parallel, at least one other user of the HF radio communications system works on a second HF channel of the plurality of HF channels using the given receivers simultaneously, wherein the given receivers are not allocated to the at least one user and the at least one other user, and wherein the second HF channel is different than the first HF channel.

In some cases, the given receivers are all of the plurality of receivers.

In some cases, the plurality of receivers include a first group of one or more receivers and a second group of one or more receivers, wherein the at least one antenna coupled to each receiver in the first group has a first directivity and the at least one antenna coupled to each receiver in the second group has a second directivity different than the first directivity, thereby enabling at least one receiver in the first group to receive one or more first HF signals communicated by a first external transmitter over a given HF channel from a first direction associated with the first directivity, and enabling at least one receiver in the second group to receive one or more second HF signals communicated by a second external transmitter over the given HF channel from a second direction associated with the second directivity.

In some cases, the plurality of receivers include a first group of one or more receivers and a second group of one or more receivers, wherein the at least one antenna coupled to each receiver in the first group has a first polarization and the at least one antenna coupled to each receiver in the second group has a second polarization different than the first polarization, and wherein one or more HF signals of a single transmission are received at a given receiver in the first group and a given receiver in the second group, thereby achieving polarization diversity.

In some cases, the central processing server is configured to perform at least one Single-Input and Multiple-Output (SIMO) or Multiple-Input and Multiple-Output (MIMO) operation on one or more respective digital samples provided by each first receiver of first receivers, being two or more of the plurality of receivers, the respective digital samples provided by a respective first receiver of the first receivers being a subset of the respective stream of digital samples provided by the respective first receiver and being associated with one or more respective first HF signals that are received by the respective first receiver, wherein the respective first HF signals are received simultaneously by the first receivers.

In some cases, the respective first HF signals are of a first HF transmission, and the at least one SIMO or MIMO operation is combining the respective digital samples provided by the first receivers into at least one combined digital sample.

In some cases, the respective first HF signals are associated with a first HF transmission and a second HF transmission, the respective digital samples have a first component associated with the first HF transmission and a second component associated with the second HF transmission, and the at least one SIMO or MIMO operation is a multi-user SIMO or MIMO operation, including: (a) combining first components of the respective digital samples provided by the first receivers into at least one combined first component, thereby enabling decoding the first HF transmission; and (b) combining second components of the respective digital samples provided by the first receivers into at least one combined second component, thereby enabling decoding the second HF transmission.

In some cases, the combining is performed by maximal-ratio combining.

In some cases, the central processing server is configured to perform one or more cognition-enabling operations based on the respective streams of digital samples or a part thereof, the cognition-enabling operations including one or more basic cognition-enabling operations.

In some cases, the basic cognition-enabling operations include: joint spectrum sensing based on the respective streams of digital samples to provide spectrum occupancy information that is indicative of an occupancy of the plurality of HF channels.

In some cases, the basic cognition-enabling operations include: analyzing and monitoring channel parameters for determining HF channel conditions at each and all of the receivers in the HF radio communications system based on first digital samples of the respective streams of digital samples.

In some cases, a given parameter of the channel parameters is a signal-to-noise ratio (SNR) of at least some of the first digital samples.

In some cases, a given parameter of the channel parameters is a Doppler Spread of each HF channel of a plurality of the HF channels in the HF radio communications system that are associated with the first digital samples.

In some cases, a given parameter of the channel parameters is noise that is local to the HF radio sites.

In some cases, the basic cognition-enabling operations include: determining a location of one or more transmitting stations that transmit the subset of the respective HF signals.

In some cases, the cognition-enabling operations include one or more advanced cognition-enabling operations that are based on results of one or more of the cognition-enabling operations.

In some cases, the advanced cognition-enabling operations include: generating one or more data sets including a plurality of records, each record of the records including results of one or more of the basic cognition-enabling operations.

In some cases, the advanced cognition-enabling operations include: performing one or more machine learning (ML) operations or deep learning (DL) operations based on results of one or more of the basic cognition-enabling operations.

In some cases, the advanced cognition-enabling operations include: performing signal fusion of results of at least one of: one or more of the basic cognition-enabling operations or one or more of the ML or DL operations.

In some cases, the central processing server is configured, based on results of one or more of the cognition-enabling operations, to perform and/or recommend performance of one or more cognition operations regarding the HF radio communications system.

In some cases, the cognition operations include: predicting ionospheric propagation conditions and interferences at each of the HF radio sites throughout the HF radio communications system.

In some cases, the cognition operations include: ranking the plurality of HF channels for each of the HF radio sites based on the predicted ionospheric propagation conditions and interferences at each of the HF radio sites.

In some cases, the cognition operations include selecting a given HF channel of the plurality of HF channels for establishing a given Automatic Link Establishment (ALE) communication link based on the ranking.

In some cases, the cognition operations include managing a Quality of Service (QOS) of an Automatic Link Establishment (ALE) communication link based on a rank of a given HF channel over which the ALE communication link is established at each of the HF radio sites that are associated with the ALE communication link.

In some cases, the plurality of geographically-distributed HF radio sites are associated with a corresponding plurality of transmitters, and wherein the cognition operations include selecting one or more given transmitters of the plurality of transmitters to perform a transmission.

In some cases, the one or more given transmitters are a plurality of given transmitters, and the transmission is a directional signal transmission.

In some cases, each respective transmitter of the plurality of given transmitters is associated with a respective control channel that is parallel to the respective transmitter, the respective control channel being configured to: (a) obtain measured channel conditions between the respective transmitter and a first receiver that receives or is designated to receive the directional signal transmission and (b) provide, in accordance with the measured channel conditions, compensation information to the respective transmitter; and each respective transmitter of the plurality of given transmitters is configured to alter at least one transmission waveform, in accordance with the compensation information provided to the respective transmitter, to achieve the directional signal transmission.

In some cases, at least one given transmitter of the plurality of given transmitters is associated with at least one HF radio site, of the HF radio sites, having a full-duplex architecture, wherein the at least one HF radio site is configured to include a control channel that is parallel to the at least one given transmitter, the control channel being configured to: (a) receive pilot control data at a given frequency from a first receiver that receives the directional signal transmission, such that the directional signal transmission and the pilot control data are subject to identical ionospheric propagation conditions, (b) measure channel conditions between the at least one given transmitter and the first receiver, in accordance with the pilot control data, and (c) provide compensation information to the at least one given transmitter based on the measured channel conditions; and wherein the at least one given transmitter is configured to alter at least one transmission waveform, in accordance with the compensation information, to achieve the directional signal transmission.

In accordance with a second aspect of the presently disclosed subject matter, there is provided a method for aggregating digital samples in a high frequency (HF) radio communications system comprising a plurality of geographically-distributed HF radio sites, the method comprising: for each HF radio site of the HF radio sites: (a) receiving respective HF signals throughout a HF band by a respective receiver, via at least one antenna; and (b) directly and concurrently sampling a subset of the respective HF signals, by the respective receiver, to provide a respective stream of digital samples, the subset being the respective HF signals that are received over a plurality of HF channels within part of the HF band or all of the HF band; and receiving, by a central processing server, a plurality of respective streams of digital samples, being the respective stream of digital samples provided by the respective receiver of each HF radio site of the HF radio sites.

In some cases, the method further comprises: for each HF radio site of the HF radio sites, processing the respective stream of digital samples by the respective receiver of the respective HF radio site, upon detecting downtime of the central processing server.

In some cases, at least one user of the HF radio communications system works on a first HF channel of the plurality of HF channels using two or more given receivers, of respective receivers of the HF radio sites, simultaneously, and in parallel, at least one other user of the HF radio communications system works on a second HF channel of the plurality of HF channels using the given receivers simultaneously, wherein the given receivers are not allocated to the at least one user and the at least one other user, and wherein the second HF channel is different than the first HF channel.

In some cases, the given receivers are all of the respective receivers.

In some cases, respective receivers of the HF radio sites include a first group of one or more receivers and a second group of one or more receivers, each receiver in the first group being coupled to at least one antenna having a first directivity and each receiver in the second group being coupled to at least one antenna having a second directivity different than the first directivity, thereby enabling at least one receiver in the first group to receive one or more first HF signals communicated by a first external transmitter over a given HF channel from a first direction associated with the first directivity, and enabling at least one receiver in the second group to receive one or more second HF signals communicated by a second external transmitter over the given HF channel from a second direction associated with the second directivity.

In some cases, respective receivers of the HF radio sites include a first group of one or more receivers and a second group of one or more receivers, each receiver in the first group being coupled to at least one antenna having a first polarization and each receiver in the second group being coupled to at least one antenna having a second polarization different than the first polarization, and wherein one or more HF signals of a single transmission can be received at a given receiver in the first group and a given receiver in the second group, thereby achieving polarization diversity.

In some cases, the method further comprises: performing at least one Single-Input and Multiple-Output (SIMO) or Multiple-Input and Multiple-Output (MIMO) operation on one or more respective digital samples provided by each first receiver of first receivers, being two or more of the respective receivers, the respective digital samples provided by a respective first receiver of the first receivers being a subset of the respective stream of digital samples provided by the respective first receiver and being associated with one or more respective first HF signals that are received by the respective first receiver, wherein the respective first HF signals are received simultaneously by the first receivers.

In some cases, the respective first HF signals are of a first HF transmission, and the at least one SIMO or MIMO operation is combining the respective digital samples provided by the first receivers into at least one combined digital sample.

In some cases, the respective first HF signals are associated with a first HF transmission and a second HF transmission, the respective digital samples have a first component associated with the first HF transmission and a second component associated with the second HF transmission, and the at least one SIMO or MIMO operation is a multi-user SIMO or MIMO operation, including: (a) combining first components of the respective digital samples provided by the first receivers into at least one combined first component, thereby enabling decoding the first HF transmission; and (b) combining second components of the respective digital samples provided by the first receivers into at least one combined second component, thereby enabling decoding the second HF transmission.

In some cases, the combining is performed by maximal-ratio combining.

In some cases, the method further comprises: performing one or more cognition-enabling operations, by the central processing server, based on the respective streams of digital samples or a part thereof, the cognition-enabling operations including one or more basic cognition-enabling operations.

In some cases, the basic cognition-enabling operations include: joint spectrum sensing based on the respective streams of digital samples to provide spectrum occupancy information that is indicative of an occupancy of the plurality of HF channels.

In some cases, the basic cognition-enabling operations include: analyzing and monitoring channel parameters for determining HF channel conditions at each and all of the receivers in the HF radio communications system based on first digital samples of the respective streams of digital samples.

In some cases, a given parameter of the channel parameters is a signal-to-noise ratio (SNR) of at least some of the first digital samples.

In some cases, a given parameter of the channel parameters is a Doppler Spread of each HF channel of a plurality of the HF channels in the HF radio communications system that are associated with the first digital samples.

In some cases, a given parameter of the channel parameters is noise that is local to the HF radio sites.

In some cases, the basic cognition-enabling operations include: determining a location of one or more transmitting stations that transmit the subset of the respective HF signals.

In some cases, the cognition-enabling operations include one or more advanced cognition-enabling operations that are based on results of one or more of the cognition-enabling operations.

In some cases, the advanced cognition-enabling operations include: generating one or more data sets including a plurality of records, each record of the records including results of one or more of the basic cognition-enabling operations.

In some cases, the advanced cognition-enabling operations include: performing one or more machine learning (ML) operations or deep learning (DL) operations based on results of one or more of the basic cognition-enabling operations.

In some cases, the advanced cognition-enabling operations include: performing signal fusion of results of at least one of: one or more of the basic cognition-enabling operations or one or more of the ML or DL operations.

In some cases, the method further comprises: performing and/or recommending performance of one or more cognition operations regarding the HF radio communications system, by the central processing server, based on results of one or more of the cognition-enabling operations.

In some cases, the cognition operations include: predicting ionospheric propagation conditions and interferences at each of the HF radio sites throughout the HF radio communications system.

In some cases, the cognition operations include: ranking the plurality of HF channels for each of the HF radio sites based on the predicted ionospheric propagation conditions and interferences at each of the HF radio sites.

In some cases, the cognition operations include selecting a given HF channel of the plurality of HF channels for establishing a given Automatic Link Establishment (ALE) communication link based on the ranking.

In some cases, the cognition operations include managing a Quality of Service (QOS) of an ALE communication link based on a rank of a given HF channel over which the ALE communication link is established at each of the HF radio sites that are associated with the ALE communication link.

In some cases, the plurality of geographically-distributed HF radio sites are associated with a corresponding plurality of transmitters; and wherein the cognition operations include selecting one or more given transmitters of the plurality of transmitters to perform a transmission.

In some cases, the one or more given transmitters are a plurality of given transmitters, and the transmission is a directional signal transmission.

In some cases, each respective transmitter of the plurality of given transmitters is associated with a respective control channel that is parallel to the respective transmitter, and the method further comprises: obtaining, by the respective control channel, measured channel conditions between the respective transmitter and a first receiver that receives or is designated to receive the directional signal transmission; providing, in accordance with the measured channel conditions, compensation information to the respective transmitter; and altering at least one transmission waveform, by the respective transmitter, in accordance with the compensation information provided to the respective transmitter, to achieve the directional signal transmission.

In some cases, at least one given transmitter of the plurality of given transmitters is associated with at least one HF radio site, of the HF radio sites, having a full-duplex architecture, the at least one HF radio site being configured to include a control channel that is parallel to the at least one given transmitter, and the method further comprises: receiving, by the control channel, pilot control data at a given frequency from a first receiver that receives the directional signal transmission, such that the directional signal transmission and the pilot control data are subject to identical ionospheric propagation conditions; measuring channel conditions between the at least one given transmitter and the first receiver, in accordance with the pilot control data; providing compensation information to the at least one given transmitter based on the measured channel conditions; and altering at least one transmission waveform, by the at least one given transmitter, in accordance with the compensation information, to achieve the directional signal transmission.

In accordance with a third aspect of the presently disclosed subject matter, there is provided a non-transitory computer readable storage medium having computer readable program code embodied therewith, the computer readable program code, executable by at least one processor of a computer to perform a method for aggregating digital samples in a high frequency (HF) radio communications system comprising a plurality of geographically-distributed HF radio sites, the method comprising: for each HF radio site of the HF radio sites: (a) receiving respective HF signals throughout a HF band by a respective receiver, via at least one antenna; and (b) directly and concurrently sampling a subset of the respective HF signals, by the respective receiver, to provide a respective stream of digital samples, the subset being the respective HF signals that are received over a plurality of HF channels within part of the HF band or all of the HF band; and receiving, by a central processing server, a plurality of respective streams of digital samples, being the respective stream of digital samples provided by the respective receiver of each HF radio site of the HF radio sites.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
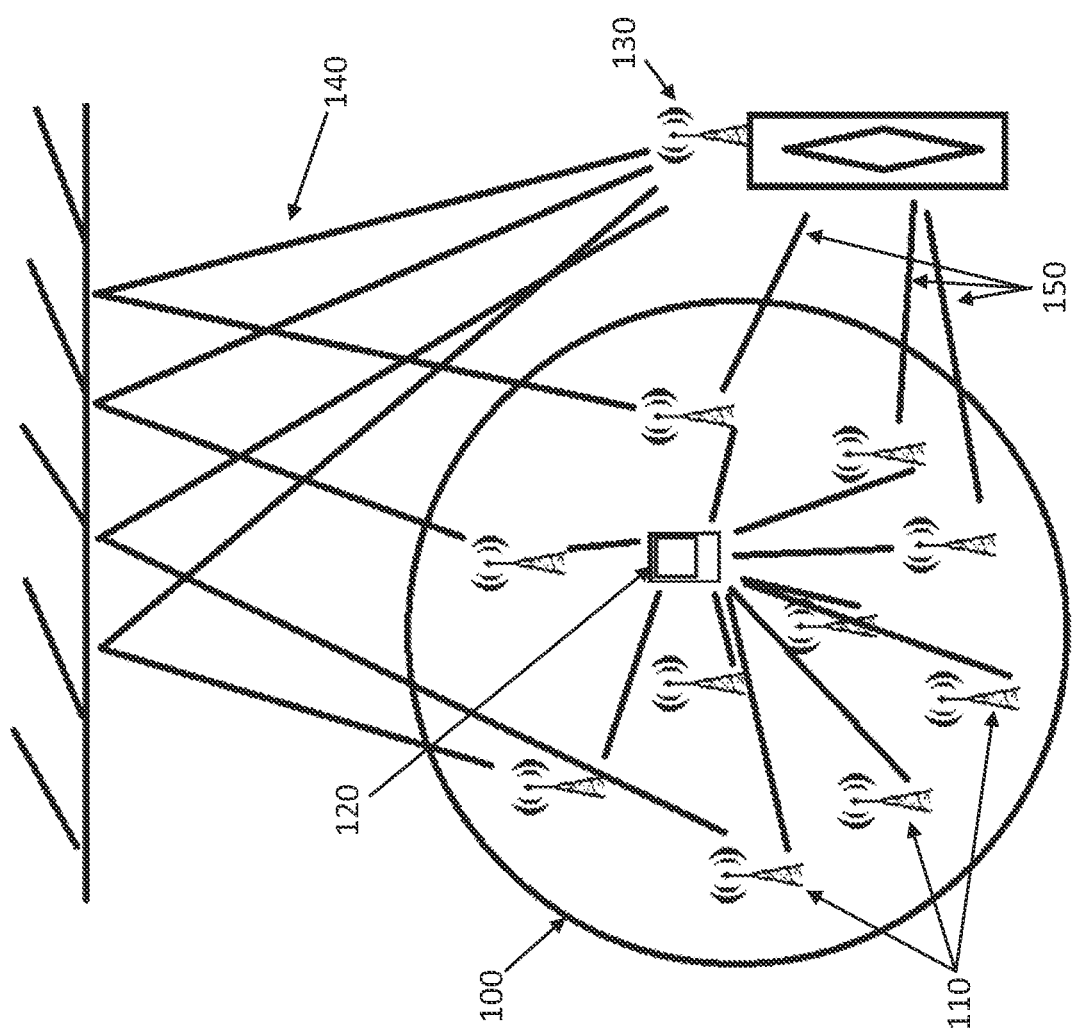
FIG. 1 is a schematic illustration of a high frequency (HF) radio communications system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "sampling", "processing", "providing", "combining", "decoding", "performing", "sensing", "analyzing", "monitoring", "determining", "generating", "predicting", "ranking", "selecting", "managing", "obtaining", "altering", "allocating", "enabling", "achieving", "receiving", "measuring" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "central processing server" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as". "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
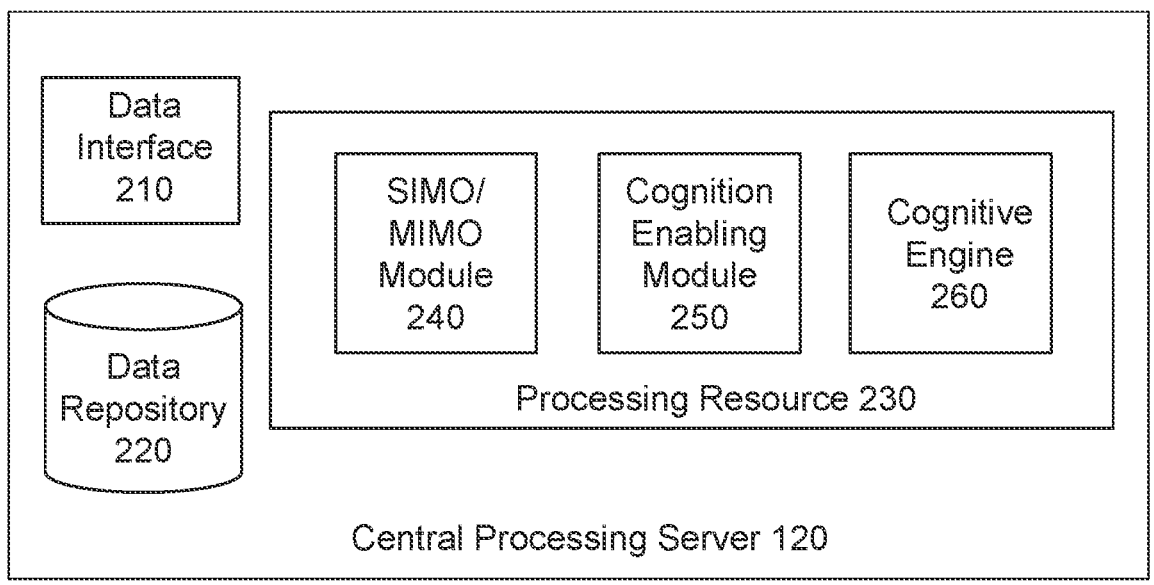
FIG. 2 is a block diagram schematically illustrating one example of a central processing server of a HF radio communications system, in accordance with the presently disclosed subject matter.
Figure 3:
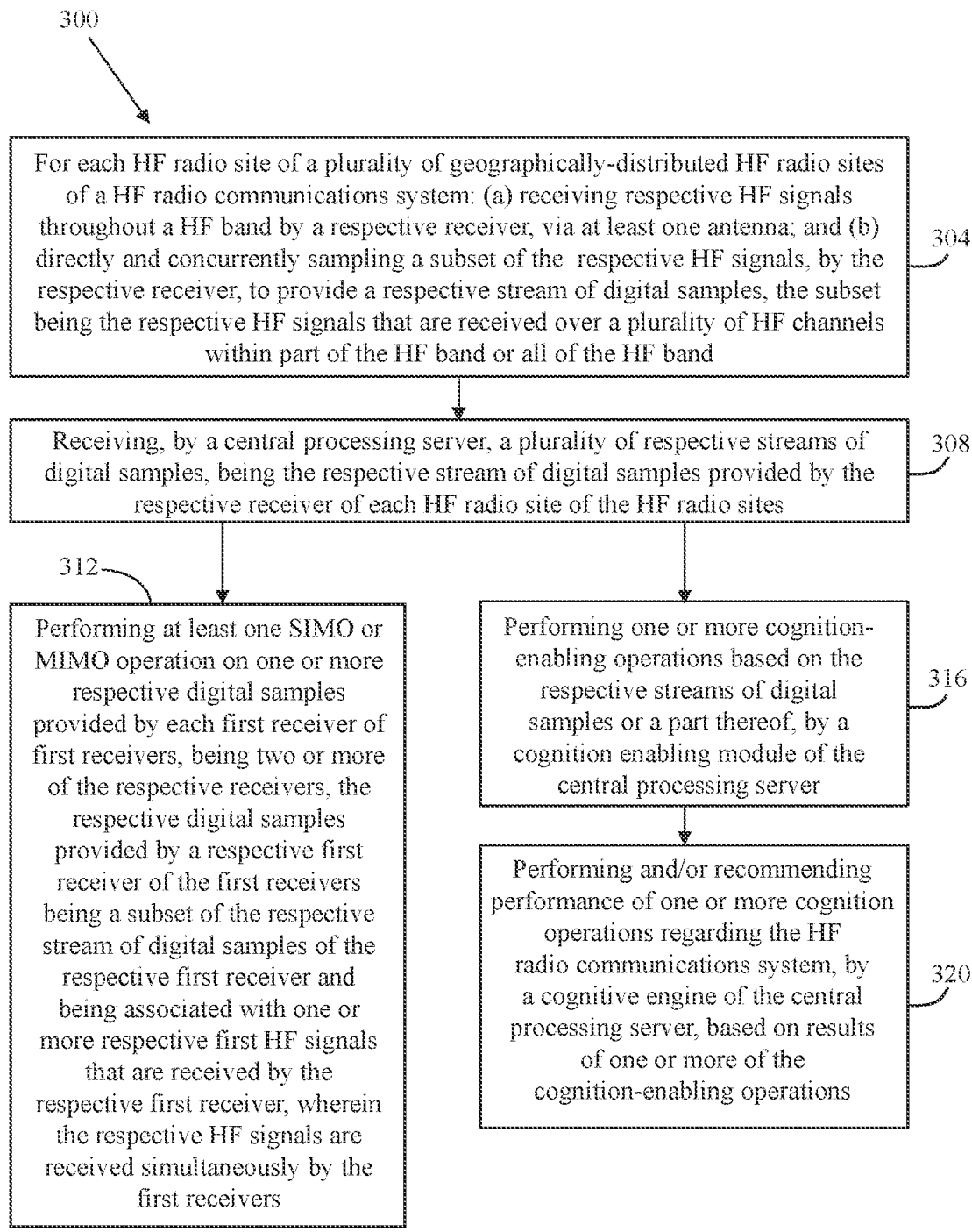
FIG. 3 is a flowchart illustrating an example of a method for aggregating digital samples in a HF radio communications system comprising a plurality of geographically-distributed HF radio sites, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIGS. 1 and 2 illustrate general schematics of the system architecture in accordance with embodiments of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a schematic illustration of a high frequency (HF) radio communications system 100, in accordance with the presently disclosed subject matter.

In accordance with the presently disclosed subject matter, HF radio communications system 100 can be configured to include a plurality of geographically-distributed HF radio sites 110 and a central processing server 120. Each HF radio site of the HF radio sites 110 can be configured to include a respective receiver (not shown).

Each receiver in the HF radio communications system 100 can be configured to receive, via at least one HF antenna, respective HF signals throughout a HF band. The HF band is defined in the present disclosure as the range of radio frequency signals between 1.5 MHz and 30 MHz. The respective HF signals can be received from one or more transmitters (e.g., a transmitter of external HF radio site 130) via propagation of sky waves 140 and/or ground waves 150. Moreover, each receiver in the HF radio communications system 100 can be configured to directly and concurrently sample a subset of the respective HF signals to provide a respective stream of digital samples, the subset being the respective HF signals that are received over a plurality of HF channels within part of the HF band or all of the HF band.

In some cases, the at least one HF antenna of a respective HF radio site can be a broadband antenna. In some cases, the at least one HF antenna can be a single antenna. Alternatively, in some cases, the at least one HF antenna can be a set of two or more co-located antennas. In some cases, the at least one HF antenna can be a set of two or more co-located HF antennas with different radiation patterns for the purpose of serving different reception angles and ranges at the respective HF radio site.

In some cases, at least one first HF radio site of the HF radio sites 110 can be configured to include a transmitter (not shown). Additionally, or alternatively, in some cases, at least one second HF radio site of the HF radio sites 110, different than the at least one first HF radio site, can be configured to be a part of a HF split-side configuration.

Central processing server 120 can be connected to each of the HF radio sites 110. In some cases, central processing server 120 can be connected to at least one of the HF radio sites 110 via a wired high speed connection (e.g., a 100 Gigabit Ethernet (100 GbE) connection).

Central processing server 120 can be configured to receive a plurality of respective streams of digital samples from the plurality of receivers in the HF radio communications system 100, being the respective stream of digital samples provided by each receiver of the plurality of receivers. Central processing server 120 can be further configured to aggregate the respective streams of digital samples, including, inter alia, extracting, manipulating and/or analyzing information (e.g., data information. HF channel parameter information, HF channel spectral information, HF radio site identification information, timing information, etc.) that is associated with the respective streams of digital samples. In some cases, this can enable providing the HF radio communications system 100 with cognitive capabilities, as detailed further herein, inter alia with reference to FIGS. 2 and 3. Since the HF radio communications system 100 includes a central processing server 120 that aggregates the respective streams of digital samples from the HF radio sites 110, rather than having each of the HF radio sites 110 processing their respective digital samples, the HF radio communications system 100 is more robust due to the ease with which a single HF radio site can be jammed.

Since the HF radio sites 110 are geographically distributed, and since the central processing server 120 can be configured to receive the respective streams of digital samples provided by the receivers at the HF radio sites 110, the HF radio communications system 100 can achieve spatial diversity. This enables at least one user of the HF radio communications system 100 to work on a first HF channel of the plurality of HF channels using two or more given receivers, of the plurality of receivers in the HF radio communications system 100, simultaneously, and in parallel, at least one other user of the HF radio communications system to work on a second HF channel of the plurality of HF channels using the given receivers simultaneously, wherein the given receivers are not allocated to the at least one user and the at least one other user, and wherein the second HF channel is different than the first HF channel. In some cases, the given receivers can be all of the receivers in the HF radio communications system 100.

In some cases, due to the achieved spatial diversity, the respective HF signals that are received at a given receiver in the HF radio communications system 100 can be statistically independent of the respective HF signals received at other receivers (i.e., receivers other than the given receiver) in the HF radio communications system 100, for example, due to the observation of different HF channel phenomena at different receivers in the HF radio communications system 100. In this manner, more information can be extracted from the respective HF signals.

In some cases, the plurality of receivers in the HF radio communications system 100 can include two or more groups of one or more receivers, wherein the at least one HF antenna coupled to each receiver of the receivers in each respective group of the groups has a respective polarization that is different for each of the groups. As a result, polarization diversity can be achieved when one or more HF signals of a single transmission are received at a given receiver(s) in each of two or more of the groups. This compensates for Ionospheric Faraday rotation, a phenomenon that causes a rotation of an original plane of polarization of a transmitted wave due to changes in ionospheric propagation conditions. In some cases, the combination of the achieved spatial diversity of the HF radio communications system 100 and the achieved polarization diversity of the HF radio communications system 100 can better ensure, relative to the achieved spatial diversity alone, that the respective HF signals received at the different receivers in the HF radio communications system 100 are statistically independent of one another, for example, by better ensuring that different HF channel phenomena are observed at the different receivers.

It is to be noted that achieving polarization diversity using a plurality of geographically-distributed HF antennas has several advantages over achieving polarization diversity using co-located cross-polarized HF antennas (HF antennas serving two polarizations at once) or co-located HF antennas of different polarization. By achieving polarization diversity using a plurality of geographically-distributed HF antennas, in contrast to achieving polarization diversity using co-located cross-polarized HF antennas or co-located HF antennas of different polarization, the reflections from the ionosphere of a given transmission can have different HF characteristics, the HF antennas can experience different local noise and interferences, and spatial diversity can be achieved, all of which enable achieving statistical independence (or greater statistical independence) between the respective HF signals received at each of the different HF antennas. Moreover, cross-polarized antennas can be inconvenient to use and expensive to buy, and it is often not possible to stack several antennas of different polarization at a single HF radio site.

In some cases, the plurality of receivers can include two or more groups of one or more receivers, wherein the at least one HF antenna coupled to each receiver of the receivers in each respective group of the groups has a respective directivity that is different for each of the groups. As a result, at least one receiver in a first group of the two or more groups can receive one or more first HF signals over a given HF channel communicated by a first external transmitter, being external to HF radio communications system 100, from a first direction associated with the first directivity. Moreover, at least one receiver in a second group of the two or more groups can receive one or more second HF signals over the given HF channel communicated by a second external transmitter, being external to HF radio communications system 100, from a second direction associated with the second directivity.

In some cases, each receiver of the receivers can be configured to process the respective stream of digital samples that is provided by the respective receiver, upon detecting downtime of central processing server 120.

Attention is now drawn to FIG. 2, a block diagram schematically illustrating one example of a central processing server 120 of a HF radio communications system 100, in accordance with the presently disclosed subject matter.

In accordance with the presently disclosed subject matter, central processing server 120 can be configured to include data interface 210.

Data interface 210 can be configured to enable the central processing server 120 to receive the respective streams of digital samples from HF radio sites 110 (e.g., via wired high speed connections) of the HF radio communications system 100 and to provide instructions to the HF radio sites 110 (e.g., via the wired high speed connections), for example, regarding HF channel selection, receiver selection, transmitter selection, etc.

Central processing server 120 can further comprise or be otherwise associated with a data repository 220 (e.g. a database, a storage system, a memory including Read Only Memory-ROM, Random Access Memory-RAM, or any other type of memory, etc.) configured to store data. The data stored can include one or more data sets, each data set of the data sets including a plurality of records, and each record of the records including information derived (e.g., by extraction, manipulation, analysis, etc.) from the respective streams of digital samples received by the central processing server 120, as detailed further herein, inter alia with reference to FIG. 3. In some cases, data repository 220 can be further configured to enable retrieval and/or update and/or deletion of the stored data. It is to be noted that in some cases, data repository 220 can be distributed.

Central processing server 120 further comprises a processing resource 230. Processing resource 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant resources of the central processing server 120 and for enabling operations related to resources of the central processing server 120.

Processing resource 230 can be configured to include, optionally, one or more of: a single-input and multiple-output (SIMO)/multiple-input and multiple-output (MIMO) module 240, a cognition enabling module 250, or a cognitive engine 260. SIMO/MIMO module 240 can be configured to perform at least one SIMO or MIMO operation, as detailed further herein, inter alia with reference to FIG. 3.

Cognition enabling module 250 can be configured to perform one or more cognition-enabling operations based on the respective streams of digital samples that are received by the central processing server 120 or a part thereof, as detailed further herein, inter alia with reference to FIG. 3.

Cognitive engine 260 can be configured, based on results of one or more of the cognition-enabling operations, to perform and/or recommend performance of one or more cognition operations regarding the HF radio communications system 100, as detailed further herein, inter alia with reference to FIG. 3.

Attention is now drawn to FIG. 3, a flowchart 300 illustrating an example of a method for aggregating digital samples in a HF radio communications system 100 comprising a plurality of geographically-distributed HF radio sites 110, in accordance with the presently disclosed subject matter.

In accordance with the presently disclosed subject matter, each HF radio site of the HF radio sites 110 can be configured to: (a) receive respective HF signals throughout a HF band by a respective receiver, via at least one antenna; and (b) directly and concurrently sample a subset of the respective HF signals, by the respective receiver, to provide a respective stream of digital samples, the subset being the respective HF signals that are received over a plurality of HF channels within part of the HF band or all of the HF band (block 304).

Central processing server 120 can be configured to receive a plurality of respective streams of digital samples, being the respective stream of digital samples provided by the respective receiver of each HF radio site of the HF radio sites 110 (block 308). Central processing server 120 can be further configured to add a timestamp to each digital sample of the respective streams of digital samples.

In some cases, central processing server 120 can be configured, using SIMO/MIMO module 240, to perform at least one SIMO or MIMO operation on one or more respective digital samples provided by each first receiver of first receivers, being two or more of the respective receivers, the respective digital samples provided by a respective first receiver of the first receivers being a subset of the respective stream of digital samples provided by the respective first receiver and being associated with one or more respective first HF signals that are received by the respective first receiver, wherein the respective first HF signals are received simultaneously by the first receivers (block 312).

In some cases, the respective first HF signals are of a first HF transmission, and the at least one SIMO or MIMO operation can be combining the respective digital samples provided by the first receivers into at least one combined digital sample. In some cases, the at least one combined digital sample can have an improved signal-to-noise ratio relative to its corresponding respective digital samples.

In some cases, the combining of the respective digital samples can be performed by maximal-ratio combining (MRC).

In some cases, the respective first HF signals are associated with a first HF transmission and a second HF transmission, the respective digital samples have a first component associated with the first HF transmission and a second component associated with the second HF transmission, and the at least one SIMO or MIMO operation can be a multi-user SIMO or MIMO operation, including: (a) combining the first components of the respective digital samples provided by the first receivers into at least one combined first component, thereby enabling decoding the first HF transmission; and (b) combining the second components of the respective digital samples provided by the first receivers into at least one combined second component, thereby enabling decoding the second HF transmission. In some cases, by performing multi-user SIMO/MIMO, the establishment of multiple point-to-point and/or point-to-multipoint Automatic Link Establishment (ALE) links over the same HF channel can be enabled.

In some cases, the combining of the first components of the respective digital samples and the combining of the second components of the respective digital samples can be performed by MRC.

In some cases, central processing server 120 can be configured, using cognition enabling module 250, to perform one or more cognition-enabling operations based on the respective streams of digital samples that are received by the central processing server 120 or a part thereof (block 316). The cognition-enabling operations can be one or more basic cognition-enabling operations (not based on results of one or more other cognition-enabling operations). In some cases, the cognition-enabling operations can be one or more advanced cognition-enabling operations that are based on results of one or more cognition-enabling operations.

In some cases, a given basic cognition-enabling operation of the basic cognition-enabling operations can be joint spectrum sensing based on the respective streams of digital samples to provide spectrum occupancy information that is indicative of an occupancy of the plurality of HF channels in the HF radio communications system 100 that are associated with the respective streams of digital samples. In some cases, a Received Signal Strength Indicator (RSSI) can be measured for each digital sample of the respective streams of digital samples (e.g., by a peak detector) to scale an output of the joint spectrum sensing to achieve meaningful values (e.g., decibel-milliwatts, watts, etc.) for the spectrum occupancy information.

In some cases, a given basic cognition-enabling operation of the basic cognition-enabling operations can be analyzing and monitoring channel parameters for determining HF channel conditions at each and all of the receivers in the HF radio communications system 100 based on first digital samples of the respective streams of digital samples, the first digital samples being associated with transmissions that are received by the receivers (including transmissions that do not designate a user of the HF radio communications system 100).

In some cases, a given parameter of the channel parameters can be a signal-to-noise ratio (SNR) of at least some of the first digital samples.

Additionally, or alternatively, in some cases, a given parameter of the channel parameters can be a Doppler Spread of each HF channel of a plurality of the HF channels in the HF radio communications system 100 that are associated with the first digital samples.

Additionally, or alternatively, in some cases, a given parameter of the channel parameters can be noise that is local to the HF radio sites 110.

In some cases, a given basic cognition-enabling operation of the basic cognition-enabling operations can be demodulating data information of at least some digital samples of the respective streams of digital samples.

In some cases, a given basic cognition-enabling operation of the basic cognition-enabling operations can be determining a location of one or more transmitting stations that transmit the subset of the respective HF signals that are sampled by each of the receivers in the HF radio communications system 100. In some cases, the location of the transmitting stations can be extracted from the respective HF signals. Additionally, or alternatively, in some cases, the location of the transmitting stations can be extracted by triangulation, etc.

As noted earlier herein, in some cases, the cognition-enabling operations can be one or more advanced cognition-enabling operations that are based on results of one or more of the cognition-enabling operations.

In some cases, a given advanced cognition-enabling operation of the advanced cognition-generating operations can be generating one or more data sets including a plurality of records, each record of the records including results of one or more basic cognition-enabling operations. A non-limiting example of a generated data set can be a link quality assessment (LQA) data set including LQA records that can enable cognitive engine 260 to predict link quality. As a non-limiting example, the LQA records can include the following: Transmitter Identifier (ID), Receiver ID, SNR, Doppler Spread, Local Noise, and Date/Time.

In some cases, one or more of the data sets can be training data sets on which machine learning (ML) or deep learning (DL) operations can be performed.

In some cases, a given advanced cognition-enabling operation of the advanced cognition-enabling operations can be machine learning (ML) or deep learning (DL) operations based on results of one or more of the basic cognition-enabling operations.

In some cases, a given advanced cognition-enabling operation of the advanced cognition-enabling operations can be signal fusion of the results of one or more of the basic cognition-enabling operations and/or one or more ML or DL operations and, optionally, additional unrelated digital signals or measurements. The output of the signal fusion can be a new signal or measurement that can be used to improve a performance of cognitive engine 260. As a non-limiting example, the signal fusion can be performed by combining spectrum occupancy information, SNR measurements and Doppler Spread measurements, among other signals and/or measurements, to provide a new quality measurement or some other output that would be unachievable absent the signal fusion.

In some cases, central processing server 120 can be configured, using cognitive engine 260, to perform and/or recommend performance of one or more cognition operations regarding the HF radio communications system 100, based on results of one or more of the cognition-enabling operations (block 320).

In some cases, the cognition operations can include predicting ionospheric propagation conditions and interferences at each of the HF radio sites 110 throughout the HF radio communications system 100 based on results of one or more of the cognition-enabling operations (e.g., SNR measurements, transmitter locations, spectrum occupancy information, local noise, ML/DL operations, signal fusion, etc.). In some cases, the cognition operations can include ranking the plurality of HF channels for each of the HF radio sites 110 in the HF radio communications system 100 based on the predicted ionospheric propagation conditions and interferences at each of the HF radio sites 110. In some cases, the plurality of HF channels can be ranked with respect to their suitability for establishing an ALE communication link. Additionally, or alternatively, in some cases, the plurality of HF channels can be ranked with respect to their suitability for enabling a desired Quality of Service (QOS) (e.g., high quality digital audio/video/data transfer).

In some cases, the cognition operations can include selecting a given HF channel of the plurality of HF channels for establishing a given ALE communication link based on the ranking of the plurality of HF channels, for each of the HF radio sites 110, with respect to their suitability for establishing an ALE communication link. In some cases, the given HF channel can also be selected in accordance with the ranking of the plurality of HF channels with respect to their suitability for enabling a desired QOS. For example, if a user of the HF radio communications system 100 wishes to send a text message, cognitive engine 260 can be configured to select a low quality HF channel over which to send the text message and to save higher quality HF channels for users of the HF radio communications system 100 that have higher QOS demands (e.g., transmitting live video). In some cases, the given HF channel can also be selected to take advantage of the antenna diversity (e.g., spatial diversity, polarization diversity, etc.) in the HF radio communications system 100.

In some cases, the cognition operations can include managing a Quality of Service (QOS) of an ALE communication link based on a rank of a given HF channel over which the ALE communication link is established at each of the HF radio sites 110 that are associated with the ALE communication link. For example, if the quality of the given HF channel decreases after establishment of the ALE communication link or ML/DL operations predict a decrease in the quality of the given HF channel, the cognitive engine 260 can recommend to the given user to transmit data at lower modulations and to use more robust coding at the expense of throughput.

In some cases, the cognition operations can include selecting one or more given transmitters in the HF radio communications system 100 to perform a transmission, based on results of one or more of the cognition-enabling operations (e.g., results of one or more basic cognition-enabling operations, results of signal fusion, etc.).

In some cases, the cognition operations can include selecting a plurality of unoccupied transmitters in the HF radio communications system 100 to achieve a directional signal transmission (i.e., beamforming), based on results of one or more of the cognition-enabling operations. In some cases, to achieve the beamforming, each respective transmitter of the unoccupied transmitters can be associated with a respective control channel that is parallel to the respective transmitter, the respective control channel being configured to: (a) obtain measured channel conditions between the respective transmitter and the receiver that receives or is designated to receive the directional signal transmission, and (b) provide, in accordance with the measured channel conditions, compensation information to the respective transmitter. Each respective transmitter of the selected unoccupied transmitters can be configured to alter at least one transmission waveform, in accordance with the compensation information provided to the respective transmitter, to achieve the beamforming.

In some cases, at least one transmitter of the selected transmitters for achieving the beamforming can be associated with at least one HF radio site (of the HF radio sites 110) having a full-duplex architecture. Moreover, the at least one HF radio site can be configured to include a control channel that is parallel to the at least one transmitter. The control channel can be configured to receive pilot control data from the receiver that receives the directional signal transmission at the same frequency as the directional signal transmission or a different frequency that is close to the frequency of the directional signal transmission, such that the directional signal transmission and the pilot control data have a similar or correlative ionospheric transmission path and are accordingly subject to the same ionospheric propagation conditions. In this manner, the control channel can be configured to measure the channel conditions between the at least one transmitter and the receiver that receives the directional signal transmission and provide compensation information to the at least one transmitter based on the measured channel conditions. The at least one transmitter can be configured to alter at least one transmission waveform, in accordance with the compensation information, to achieve the beamforming.

In some cases, cognitive engine 260 can be configured to use the results of machine learning and/or deep learning operations to improve a performance of SIMO or MIMO operations by SIMO/MIMO module 240.

It is to be noted that, with reference to FIG. 3, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A high frequency (HF) radio communications system comprising:
   a plurality of geographically-distributed HF radio units comprising a corresponding plurality of receivers, each receiver of the plurality of receivers being configured to: (a) receive, via at least one antenna, respective HF signals throughout a HF band, and (b) directly and concurrently sample a subset of the respective HF signals to provide a respective stream of digital samples, the subset being the respective HF signals that are received over a plurality of HF channels within a part of the HF band or all of the HF band; and
   a central processing server configured to receive a plurality of respective streams of digital samples from the plurality of receivers, the plurality of respective streams of digital samples being the respective stream of digital samples provided by each receiver of the receivers.

2. The HF radio communications system of claim 1, wherein at least one user of the HF radio communications system works on a first HF channel of the plurality of HF channels utilizing two or more given receivers, of the plurality of receivers, simultaneously, and in parallel, at least one other user of the HF radio communications system works on a second HF channel of the plurality of HF channels utilizing the given receivers simultaneously, wherein the given receivers are not allocated to the at least one user and the at least one other user, and wherein the second HF channel is different than the first HF channel.

3. The HF radio communications system of claim 1, wherein the central processing server is configured to perform at least one Single-Input and Multiple-Output (SIMO) or Multiple-Input and Multiple-Output (MIMO) operation on one or more respective digital samples provided by each first receiver of first receivers, being two or more of the plurality of receivers, the respective digital samples provided by a respective first receiver of the first receivers being a subset of the respective stream of digital samples provided by the respective first receiver and being associated with one or more respective first HF signals that are received by the respective first receiver, and wherein the respective first HF signals are received simultaneously by the first receivers.

4. The HF radio communications system of claim 3, wherein the respective first HF signals are associated with a first HF transmission and a second HF transmission, wherein the respective digital samples have a first component associated with the first HF transmission and a second component associated with the second HF transmission, and wherein the at least one SIMO or MIMO operation is a multi-user SIMO or MIMO operation, including: (a) combining first components of the respective digital samples provided by the first receivers into at least one combined first component, thereby enabling decoding the first HF transmission; and (b) combining second components of the respective digital samples provided by the first receivers into at least one combined second component, thereby enabling decoding the second HF transmission.

5. The HF radio communications system of claim 1, wherein the central processing server is configured to perform one or more cognition-enabling operations based on the respective streams of digital samples or a part thereof, the cognition-enabling operations including one or more basic cognition-enabling operations comprising one or more of: (a) joint spectrum sensing based on the respective streams of digital samples to provide spectrum occupancy information that is indicative of an occupancy of the plurality of HF channels, (b) analyzing and monitoring channel parameters for determining HF channel conditions at each and all of the receivers in the HF radio communications system based on first digital samples of the respective streams of digital samples, or (c) determining a location of one or more transmitting stations that transmit the subset of the respective HF signals.

6. The HF radio communications system of claim 5, wherein the central processing server is configured, based on results of one or more of the cognition-enabling operations, to at least one of: (a) perform one or more first operations regarding the HF radio communications system, or (b) recommend performance of one or more second operations regarding the HF radio communications system, the first operations and the second operations being cognition operations.

7. The HF radio communications system of claim 6, wherein the cognition operations include:
predicting ionospheric propagation conditions and interferences at each of the HF radio units throughout the HF radio communications system; and
ranking the plurality of HF channels for each of the HF radio units based on the predicted ionospheric propagation conditions and interferences at each of the HF radio units.

8. The HF radio communications system of claim 7, wherein the cognition operations include selecting a given HF channel of the plurality of HF channels for establishing a given Automatic Link Establishment (ALE) communication link based on the ranking.

9. The HF radio communications system of claim 6, wherein the plurality of geographically-distributed HF radio units are associated with a corresponding plurality of transmitters, and wherein the cognition operations include selecting one or more given transmitters of the plurality of transmitters to perform a transmission.

10. The HF radio communications system of claim 1, wherein each receiver of the receivers is further configured to process the respective stream of digital samples, upon detecting downtime of the central processing server.

11. A method for aggregating digital samples in a high frequency (HF) radio communications system comprising a plurality of geographically-distributed HF radio units, the method comprising:
for each HF radio unit of the HF radio units: (a) receiving respective HF signals throughout a HF band by a respective receiver, via at least one antenna; and (b) directly and concurrently sampling a subset of the respective HF signals, by the respective receiver, to provide a respective stream of digital samples, the subset being the respective HF signals that are received over a plurality of HF channels within a part of the HF band or all of the HF band; and
receiving, by a central processing server, a plurality of respective streams of digital samples, the plurality of respective streams of digital samples being the respective stream of digital samples provided by the respective receiver of each HF radio unit of the HF radio units.

12. The method of claim 11, wherein at least one user of the HF radio communications system works on a first HF channel of the plurality of HF channels utilizing two or more given receivers, of respective receivers of the HF radio units, simultaneously, and in parallel, at least one other user of the HF radio communications system works on a second HF channel of the plurality of HF channels utilizing the given receivers simultaneously, wherein the given receivers are not allocated to the at least one user and the at least one other user, and wherein the second HF channel is different than the first HF channel.

13. The method of claim 11, further comprising:
performing at least one Single-Input and Multiple-Output (SIMO) or Multiple-Input and Multiple-Output (MIMO) operation on one or more respective digital samples provided by each first receiver of first receivers, being two or more of the respective receivers, the respective digital samples provided by a respective first receiver of the first receivers being a subset of the respective stream of digital samples provided by the respective first receiver and being associated with one or more respective first HF signals that are received by the respective first receiver,
wherein the respective first HF signals are received simultaneously by the first receivers.

14. The method of claim 13, wherein the respective first HF signals are associated with a first HF transmission and a second HF transmission, wherein the respective digital samples have a first component associated with the first HF transmission and a second component associated with the second HF transmission, and wherein the at least one SIMO or MIMO operation is a multi-user SIMO or MIMO operation, including: (a) combining first components of the respective digital samples provided by the first receivers into at least one combined first component, thereby enabling decoding the first HF transmission; and (b) combining second components of the respective digital samples provided by the first receivers into at least one combined second component, thereby enabling decoding the second HF transmission.

15. The method of claim 11, further comprising:
performing one or more cognition-enabling operations, by the central processing server, based on the respective streams of digital samples or a part thereof, the cognition-enabling operations including one or more basic cognition-enabling operations comprising one or more of: (a) joint spectrum sensing based on the respective streams of digital samples to provide spectrum occupancy information that is indicative of an occupancy of the plurality of HF channels, (b) analyzing and monitoring channel parameters for determining HF channel conditions at each and all of the receivers in the HF radio communications system based on first digital samples of the respective streams of digital samples, or (c) determining a location of one or more transmitting stations that transmit the subset of the respective HF signals.

16. The method of claim 15, further comprising:
at least one of: (a) performing one or more first operations regarding the HF radio communications system, or (b) recommending performance of one or more second operations regarding the HF radio communications system, by the central processing server, based on results of one or more of the cognition-enabling operations, the first operations and the second operations being cognition operations.

17. The method of claim 16, wherein the cognition operations include:
predicting ionospheric propagation conditions and interferences at each of the HF radio units throughout the HF radio communications system; and ranking the plurality of HF channels for each of the HF radio units based on the predicted ionospheric propagation conditions and interferences at each of the HF radio units.

18. The method of claim 17, wherein the cognition operations include selecting a given HF channel of the plurality of HF channels for establishing a given Automatic Link Establishment (ALE) communication link based on the ranking.

19. The method of claim 16, wherein the plurality of geographically-distributed HF radio units are associated with a corresponding plurality of transmitters; and wherein the cognition operations include selecting one or more given transmitters of the plurality of transmitters to perform a transmission.

20. A non-transitory computer readable storage medium having computer readable program code embodied therewith, the computer readable program code, executable by at least one processor of a computer to perform a method for aggregating digital samples in a high frequency (HF) radio communications system comprising a plurality of geographically-distributed HF radio units, the method comprising:

for each HF radio unit of the HF radio units: (a) receiving respective HF signals throughout a HF band by a respective receiver, via at least one antenna; and (b) directly and concurrently sampling a subset of the respective HF signals, by the respective receiver, to provide a respective stream of digital samples, the subset being the respective HF signals that are received over a plurality of HF channels within a part of the HF band or all of the HF band; and receiving, by a central processing server, a plurality of respective streams of digital samples, the plurality of respective streams of digital samples being the respective stream of digital samples provided by the respective receiver of each HF radio unit of the HF radio units.

* * * * *